(12) United States Patent
Edamadaka et al.

(10) Patent No.: US 7,852,992 B1
(45) Date of Patent: Dec. 14, 2010

(54) METHODS AND APPARATUS FOR AUDIO COMMUNICATION

(75) Inventors: Rajeshwari Edamadaka, Allentown, NJ (US); Timothy Ian Ross, Fair Haven, NJ (US); James Edward Moore, Welwyn Garden City (GB)

(73) Assignee: Avaya Inc., Basking Ridge, NJ (US)

( * ) Notice: Subject to any disclaimer, the term of this patent is extended or adjusted under 35 U.S.C. 154(b) by 1065 days.

(21) Appl. No.: 11/599,673

(22) Filed: Nov. 14, 2006

(51) Int. Cl.
*H04M 1/64* (2006.01)

(52) U.S. Cl. .................................. 379/67.1; 379/88.1

(58) Field of Classification Search ............. 379/67.1, 379/88.1
See application file for complete search history.

(56) References Cited

U.S. PATENT DOCUMENTS

| | | | | |
|---|---|---|---|---|
| 2002/0087592 A1* | 7/2002 | Ghani | | 707/500 |
| 2002/0128906 A1* | 9/2002 | Belth | | 705/14 |
| 2003/0040966 A1* | 2/2003 | Belth | | 705/14 |
| 2003/0193930 A1* | 10/2003 | Wotherspoon et al. | | 370/352 |
| 2003/0235407 A1* | 12/2003 | Lord | | 386/96 |
| 2006/0114854 A1* | 6/2006 | Wotherspoon et al. | | 370/329 |
| 2006/0126560 A1* | 6/2006 | Wotherspoon et al. | | 370/329 |

* cited by examiner

*Primary Examiner*—Creighton Smith
(74) *Attorney, Agent, or Firm*—Chapin IP Law, LLC

(57) ABSTRACT

A system receives a complete audio message from an originator, and transmits the complete audio message to a destination. The system buffers the complete audio message at the destination. The complete audio message is capable of being played at the destination during the buffering. The system provides an ability to replay the complete audio message at the destination after the buffering of the complete audio message. The system provides an ability to respond to the complete audio message.

20 Claims, 10 Drawing Sheets

```
┌─────────────────────────────────────────────────────────────────────────┐
│ 226 BUFFER THE AUDIO MESSAGE AT THE DESTINATION, THE AUDIO MESSAGE      │
│ CAPABLE OF BEING PLAYED AT THE DESTINATION DURING THE BUFFERING         │
│                                                                          │
│   ┌─────────────────────────────────────────────────────────────────┐   │
│   │ 227 TRANSMIT A PLURALITY OF AUDIO MESSAGES TO THE DESTINATION   │   │
│   └─────────────────────────────────────────────────────────────────┘   │
│                                    │                                     │
│                                    ▼                                     │
│   ┌─────────────────────────────────────────────────────────────────┐   │
│   │ 228 BUFFER THE PLURALITY OF AUDIO MESSAGES ACCORDING TO A       │   │
│   │ SEQUENCE                                                         │   │
│   │                                                                  │   │
│   │   ┌───────────────────────────────────────────────────────────┐ │   │
│   │   │ 229 IDENTIFY THE SEQUENCE AS AN ORDER OF ARRIVAL OF       │ │   │
│   │   │ EACH OF THE PLURALITY OF AUDIO MESSAGES                   │ │   │
│   │   └───────────────────────────────────────────────────────────┘ │   │
│   │                              OR                                  │   │
│   │   ┌───────────────────────────────────────────────────────────┐ │   │
│   │   │ 230 IDENTIFY THE SEQUENCE AS AN IMPORTANCE ASSOCIATED     │ │   │
│   │   │ WITH EACH OF THE PLURALITY OF AUDIO MESSAGES              │ │   │
│   │   └───────────────────────────────────────────────────────────┘ │   │
│   └─────────────────────────────────────────────────────────────────┘   │
│                                    │                                     │
│                                    ▼                                     │
│   ┌─────────────────────────────────────────────────────────────────┐   │
│   │ 231 PROVIDE AN ABILITY TO PLAY THE PLURALITY OF AUDIO MESSAGES  │   │
│   │ ACCORDING TO THE SEQUENCE                                        │   │
│   └─────────────────────────────────────────────────────────────────┘   │
└─────────────────────────────────────────────────────────────────────────┘
```

FIG. 8

232 BUFFER THE AUDIO MESSAGE AT THE DESTINATION, THE AUDIO MESSAGE CAPABLE OF BEING PLAYED AT THE DESTINATION DURING THE BUFFERING

233 PROVIDE AN ABILITY TO PAUSE THE AUDIO MESSAGE DURING A PLAYING OF THE AUDIO MESSAGE

↓

234 PROVIDE AN ABILITY TO RESUME THE PLAYING OF THE AUDIO MESSAGE

OR

235 NOTIFY AT LEAST ONE USER AT THE DESTINATION THAT AN AUDIO MESSAGE HAS BEEN TRANSMITTED

*FIG. 9*

METHODS AND APPARATUS FOR AUDIO COMMUNICATION

BACKGROUND

Conventional computerized devices, such as personal computers, laptop computers, telephones, and the like, allow people to communicate via telephone, cell phone, voicemail, email, instant messaging, fax, videoconference, etc. Conventional computerized devices allow people to communicate using audio communications in a real-time manner, such as when communicating via videoconferencing, telephone, push-to-talk phones, etc. Conventional computerized devices also allow people to communicate in a time-delayed manner, such as when a recipient of an audio communication is not available. For example, when a phone call arrives, and the recipient is not available, voice mail can be left. Voice mail is stored, and then retrieved by the recipient at a time that is convenient for the recipient. Answering machines store a message as a caller is delivering the message. The recipient of the message can pick up the phone during the delivery of the message and respond to the caller. Only that portion of the message that was recorded up to the point where the recipient picked up the telephone is stored on the answering machine.

SUMMARY

Conventional technologies for audio communication either real time or in a time-delayed manner, suffer from a variety of deficiencies. In particular, conventional technologies for audio communication (either real time or in a time-delayed manner) are limited in that audio communications fall into one category (real time or time-delayed) or another. For example, telephone calls, videoconferences, etc., allow two or more people to communicate in real time. Push-to-talk devices also allow two or more people to communicate in real time. Voicemail services allow one person to leave an audio communication for one or more recipients, for retrieval at a later convenient time for the recipients. However, audio communications do not provide the benefits of both real time and time-delayed audio communications. Audio communications do not allow an incoming message to be both received (i.e., 'listened to' by the recipient) real time, and stored for future retrieval. Answering machines receive and record (i.e., store) the message, as a caller is delivering the message. However answering machines do not receive the completed message. A recipient of the message can pick up the phone during the delivery of the message and respond to the caller. In this scenario, the completed message would not be stored in the answering machine. The completed message would not be available at a later point in time (i.e., to hear the complete message the caller intended to leave on the answering machine).

Embodiments disclosed herein significantly overcome such deficiencies and provide a system that includes a computer system executing an audio communicating process that receives a complete audio message, and transfers the complete audio message to a destination. The audio communicating process then buffers the complete audio message received at the destination. The complete audio message is buffered such that a user at the destination (i.e., a recipient) can listen to the complete audio message real time, and respond to the complete audio message. The audio communicating process notifies a user at the destination that a complete audio message has been transmitted. The user can replay the buffered complete audio message at a later time. The user can pause the playing of the buffered complete audio message, and then resume the playing of the buffered complete audio message. In an example embodiment, the audio communicating process converts the complete audio message to a text message, such that the recipient receives the complete audio message as a text message. The user can respond to the buffered message using the audio communicating process, by responding with another complete audio message, or other media message (i.e., text message, etc.).

The audio communicating process can identify a user associated with the destination as the recipient of the complete audio message, and can transmit the complete audio message to that user even if the user is not located at the destination (i.e., located at a different destination).

The audio communicating process can transmit a plurality of complete audio messages to the destination and buffer the plurality of complete audio messages according to a sequence. The sequence can be the order in which the audio communicating process received the complete audio messages from an originator, or according to an importance associate with each of the complete audio messages.

An originator of the complete audio message can specify a time delay with which to delay the transmittal of the complete audio message. The audio communicating process notifies the originator of the complete audio message of the status of a user (i.e., recipient) at the destination (i.e., online, busy, etc.). The originator can specify instructions associated with the complete audio message, based on the status of the recipient. For example, the originator can decide not to transmit the complete audio message, if the recipient of the complete audio message has a status of 'busy', etc. In an example embodiment, the originator views the status of the recipient, sees that the recipient has a status of 'online and available' and decides to create the audio message, based on the fact that the recipient is available to receive the complete audio message. The audio communicating process can transmit the complete audio message to a plurality of recipients. The originator can also specify a policy associated with the complete audio message, for example, the complete audio message is marked as private. The audio communicating process determines the status of a user at the destination, for example, that the user is wearing a headset. The audio communicating process then determines that the wearing of the headset permits the delivery of a complete audio message with a policy specified as being private. The audio communicating process also determines a plurality of users (i.e., recipients) associated with the destination, and determines if a policy associated with the complete audio message permits transmittal to that destination. In other words, if one of the users (i.e., recipients) does not have permission to receive a 'private' complete audio message from the originator, the audio communicating process will not transmit the complete audio message to that destination, even if the other users in that destination have permission to receive the private complete audio message.

The audio communicating process receives a complete audio message from an originator, and transmits the complete audio message to a destination. The audio communicating process buffers the complete audio message at the destination. The complete audio message is capable of being played at the destination during the buffering. The audio communicating process provides an ability to replay the complete audio message at the destination, after the buffering of the complete audio message. The audio communicating process provides an ability to respond to the complete audio message via a media message.

During an example operation of one embodiment, suppose a user (i.e., a recipient) is sitting in an office, working on a computer. An originator, using the audio communicating process, determines the status of the user is 'online', and transmits a complete audio message to the user. The complete audio message is played on the user's computer such that the user can hear the complete audio message. The complete audio message is buffered such that the user can replay the complete audio message at a later time. The user, using the audio communicating process, responds to the complete audio message by transmitting a response audio message back to the originator. The user can also respond to the complete audio message with, for example, a text message.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Avaya Inc. of Lincroft, N.J.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 8 illustrates a flowchart of a procedure performed by the system of FIG. 1, when the audio communicating process buffers the complete audio message at the destination, the complete audio message capable of being played at the destination during the buffering, according to one embodiment disclosed herein.

FIG. 9 illustrates a flowchart of a procedure performed by the system of FIG. 1, when the audio communicating process buffers the complete audio message at the destination, and provides an ability to pause the complete audio message during a playing of the complete audio message, according to one embodiment disclosed herein.

DETAILED DESCRIPTION

Figure 1:
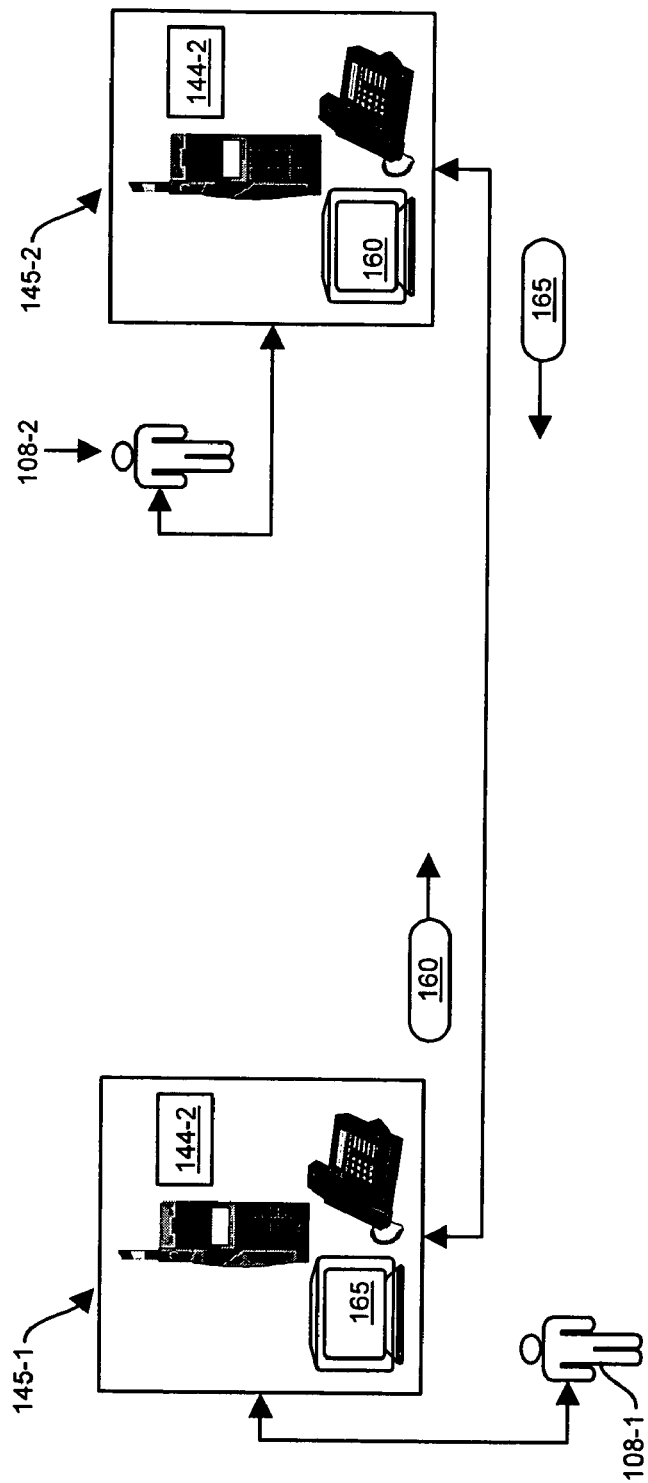
FIG. 1 shows a high level view of a system executing an audio communicating process according to one embodiment disclosed herein.

Embodiments disclosed herein include an audio communicating process that receives a complete audio message, and transfers the complete audio message to a destination. The audio communicating process then buffers the complete audio message received at the destination. The complete audio message is buffered such that a user at the destination (i.e., a recipient) can listen to the complete audio message real time, and respond to the complete audio message. The audio communicating process notifies a user at the destination that a complete audio message has been transmitted. The user can replay the buffered complete audio message at a later time. The user can pause the playing of the buffered complete audio message, and then resume the playing of the buffered complete audio message. In an example embodiment, the audio communicating process converts the complete audio message to a text message, such that the recipient receives the complete audio message as a text message. The user can respond to the buffered message using the audio communicating process, by responding with another complete audio message, or other media message (i.e., text message, etc.).

The audio communicating process can identify a user associated with the destination as the recipient of the complete audio message, and can transmit the complete audio message to that user even if the user is not located at the destination (i.e., located at a different destination).

The audio communicating process can transmit a plurality of complete audio messages to the destination and buffer the plurality of complete audio messages according to a sequence. The sequence can be the order in which the audio communicating process received the complete audio messages from an originator, or according to an importance associate with each of the complete audio messages.

An originator of the complete audio message can specify a time delay with which to delay the transmittal of the complete audio message. The audio communicating process notifies the originator of the complete audio message of the status of a user (i.e., recipient) at the destination (i.e., online, busy, etc.). The originator can specify instructions associated with the complete audio message, based on the status of the recipient. For example, the originator can decide not to transmit the complete audio message, if the recipient of the complete audio message has a status of 'busy', etc. In an example embodiment, the originator views the status of the recipient, sees that the recipient has a status of 'online and available' and decides to create the audio message, based on the fact that the recipient is available to receive the complete audio message. The audio communicating process can transmit the complete audio message to a plurality of recipients. The originator can also specify a policy associated with the complete audio message, for example, the complete audio message is marked as private. The audio communicating process determines the status of a user at the destination, for example, that the user is wearing a headset. The audio communicating process then determines that the wearing of the headset permits the delivery of a complete audio message with a policy specified as being private. The audio communicating process also determines a plurality of users (i.e., recipients) associated with the destination, and determines if a policy associated with the complete audio message permits transmittal to that destination. In other words, if one of the users (i.e., recipients) does not have permission to receive a 'private' complete audio message from the originator, the audio communicating process will not transmit the complete audio message to that destination, even if the other users in that destination have permission to receive the private complete audio message.

The audio communicating process receives a complete audio message from an originator, and transmits the complete audio message to a destination. The audio communicating process buffers the complete audio message at the destination. The complete audio message is capable of being played at the destination during the buffering. The audio communicating process provides an ability to replay the complete audio message at the destination, after the buffering of the complete audio message. The audio communicating process provides an ability to respond to the complete audio message via a media message.

Figure 2:
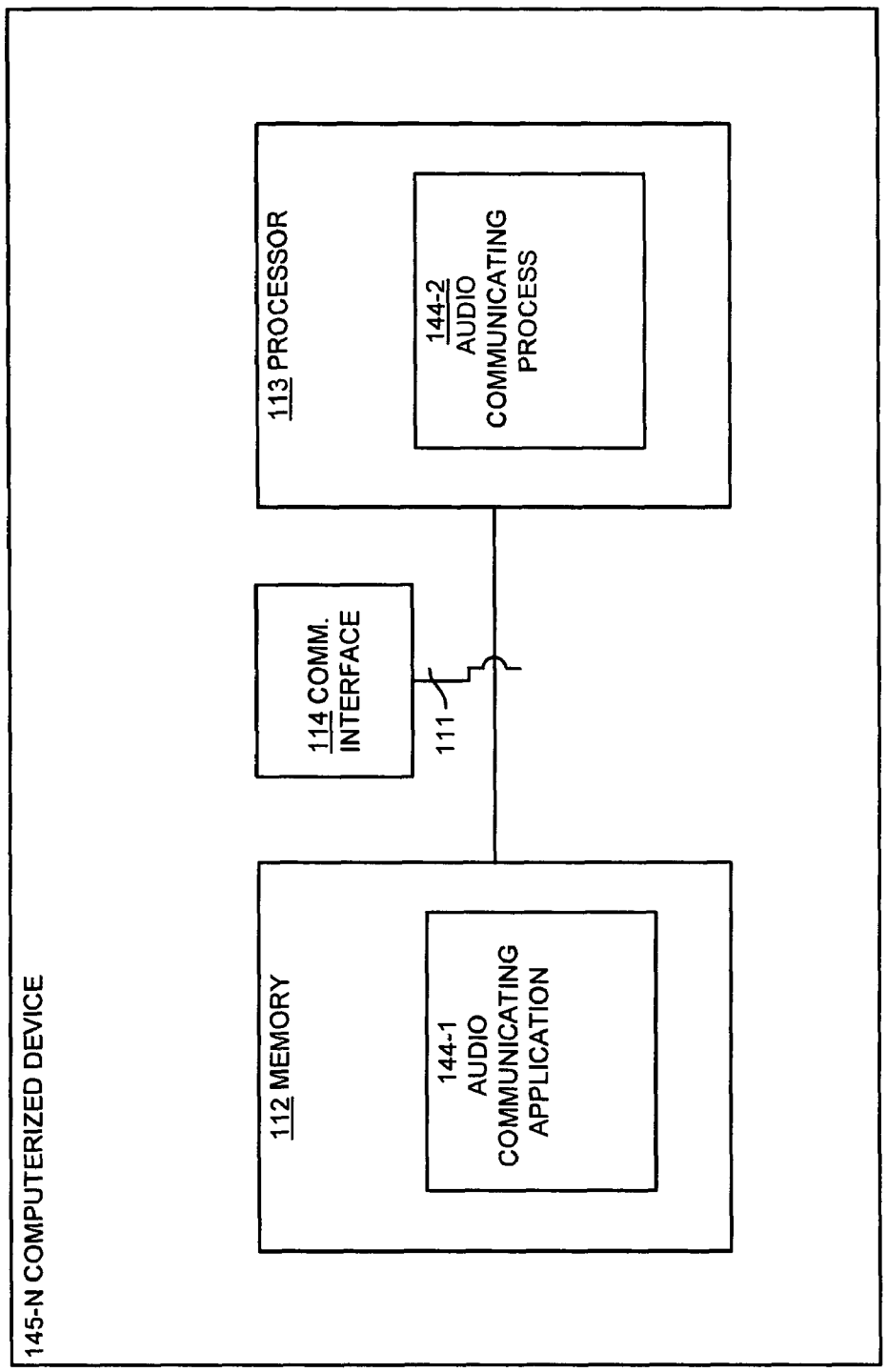
FIG. 2 shows a high-level block diagram of a computer system according to one embodiment disclosed herein

FIG. 1 is an example high-level view of a system executing an audio communicating process 144-2 according to one embodiment disclosed herein. Users 108-N communicate via a device 145-N, such as computer, cell phone, telephone, etc. Each device 145-N runs an instance of the audio communicating process 144-2. User 108-1 is an originator who sends a complete audio message 160, from the originator's device 145-1, to user 108-2 who is the recipient of the complete audio message 160. The audio communicating process 144-2 buffers the complete audio message 160 at the user's 108-2 device 145-2. User 108-2 (i.e., the recipient) receives the complete audio message 160, and is able to listen to the complete audio message 160, on the user's 108-2 device 145-N, such as the users' 108-2 computer. Likewise, when user 108-2 is the originator of the complete response audio message 165, the audio communicating process 144-2 buffers the complete response audio message 165 at the user's 108-1 (i.e., the recipient) device 145-1. User 108-1 is then able to listen to the complete response audio message 165 on the user's 108-1 device 145-1. FIG. 2 explains further details of the device 145-N running an instance of the audio communicating process 144-2.

FIG. 2 illustrates an example architecture of a computer system 145. The computer system 140 may be any type of computerized device such as a personal computer, workstation, portable computing device, console, laptop, network terminal or the like. In this example, the computer system 140 includes an interconnection mechanism 111 that couples a memory system 112, a processor 113, and a communications interface 114. The communications interface 114 enables the computer system 140 to communicate with other devices (i.e., other computers) on a network (not shown). This can allow access to the audio communicating application by remote computer systems.

The memory system 112 may be any type of computer readable medium that is encoded with an audio communicating application 144-1 that may be embodied as software code such as data and/or logic instructions (e.g., code stored in the memory or on another computer readable medium such as a removable disk) that supports processing functionality according to different embodiments described herein. During operation of the computer system 140, the processor 113 accesses the memory system 112 via the interconnect 111 in order to launch, run, execute, interpret or otherwise perform the logic instructions of the audio communicating application 144-1. Execution of audio communicating application 144-1 in this manner produces processing functionality in an audio communicating process 144-2. In other words, the audio communicating process 144-2 represents one or more portions of runtime instances of the audio communicating application 144-1 (or the entire application 140-1) performing or executing within or upon the processor 113 in the computerized system 140 at runtime. It is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, that have been left out of this illustration for ease of description.

Further details of configurations explained herein will now be provided with respect to a flow chart of processing steps that show the high level operations disclosed herein to perform the content formatting process.

Figure 3:
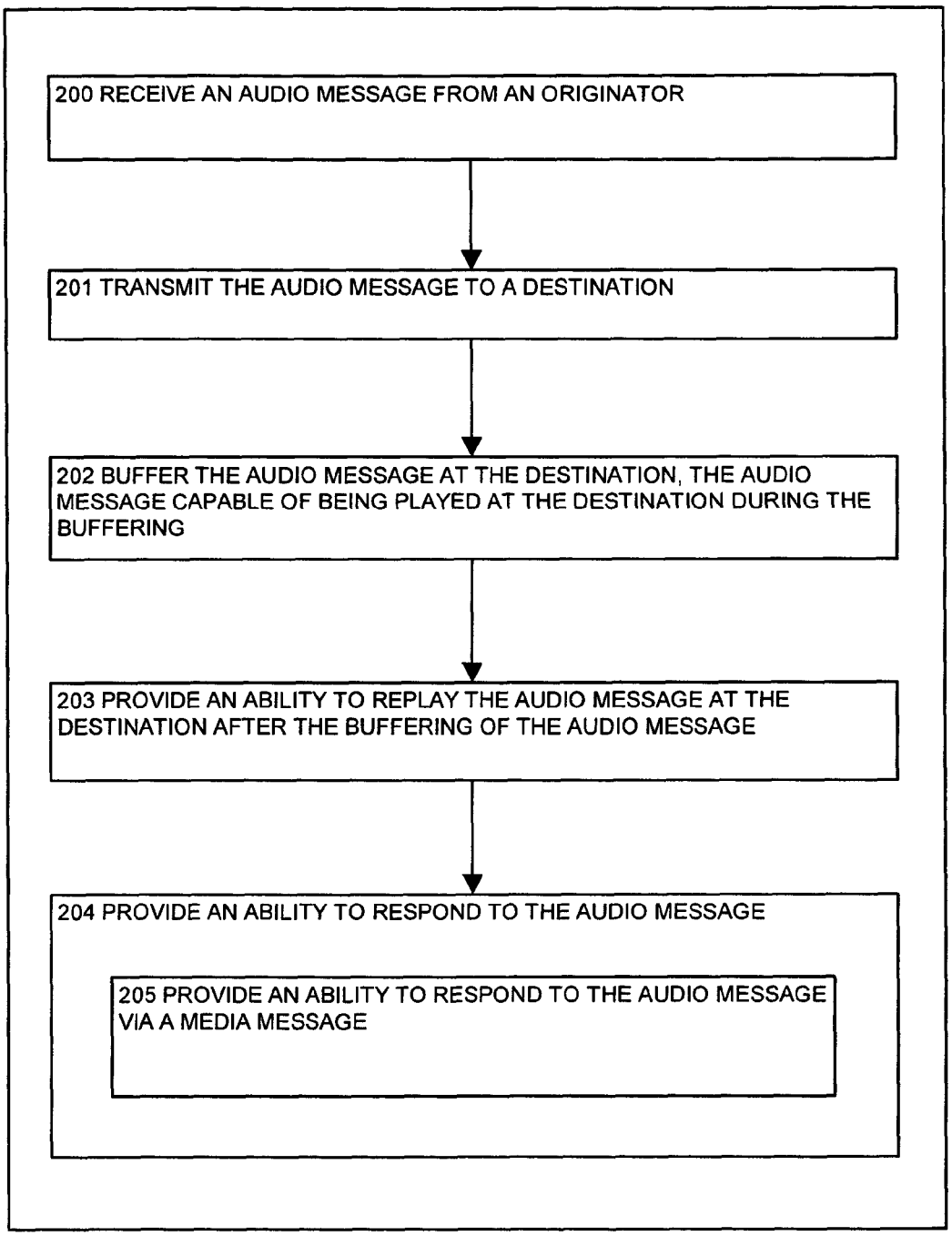
FIG. 3 illustrates a flowchart of a procedure performed by the system of FIG. 1, when the audio communicating process receives a complete audio message from an originator, according to one embodiment disclosed herein.

FIG. 3 is an embodiment of the steps performed by the audio communicating process 144-2 when it receives a complete audio message 160 from an originator (i.e., user 108-1).

In step 200, the audio communicating process 144-2 receives a complete audio message 160 from an originator (i.e., user 108-1). An originator (i.e., user 108-1) may choose to send a complete audio message versus an email or text message to remove the perceived space between two people in different locations. Speaking a complete audio message 160 is faster than typing an email message. An originator (i.e., user 108-1) can add emotion, and inflection to a complete audio message 160, allowing the originator (i.e., user 108-1) to have the ability to personalize the complete audio message 160 for the recipient (i.e., user 108-2). Essentially, sending a complete audio message 160 creates the effect of two people sitting side by side, having a conversation.

In step 201, the audio communicating process 144-2 transmits the complete audio message 160 to a destination. The complete audio message 160 originates from the originator (i.e., user 108-1), and is received by the audio communicating process 144-2 as a complete audio message 160. The audio communicating process 144-2 then transmits the complete audio message 160 to the destination designated by the originator (i.e., user 108-1)

In step 202, the audio communicating process 144-2 buffers the complete audio message 160 at the destination. The complete audio message 160 is capable of being played at the destination during the buffering. The complete audio message 160 is received at the destination in 'soon time'. 'Soon time' is not real time, but, rather, provides a delay between when the complete audio message 160 is created, and when it is transmitted to a destination.

In step 203, the audio communicating process 144-2 provides an ability to replay the complete audio message 160 at the destination after the buffering of the complete audio message 160. The transmitted complete audio message 160 can be heard at the destination when the audio communicating process 144-2 transmits the complete audio message 160. The complete audio message 160 is also buffered at the destination such that a recipient (i.e., user 108-2) can replay the complete audio message 160 at a later time.

In step 204, the audio communicating process 144-2 provides an ability to respond to the complete audio message 160. Once the complete audio message 160 has been transmitted to the destination, a user 108-2 at that destination can respond to the complete audio message 160. For example, if the complete audio message 160 is received by the user 108-2 via a computer, the user 108-2 can, for example, select an icon representing the complete audio message 160, and respond to the complete audio message 160 by sending a complete response audio message 165 from user 108-2 to user 108-1. In an example embodiment, the user 108-2 receives the complete audio message 160, via a cell phone. The user 108-2 can, for example, choose to speak voice commands, indicating the user 108-2 wishes to respond to the complete audio message 160. The user 108-2 then responds to the complete audio message 160 by sending a complete response audio message 165 from user 108-2 to user 108-1. In an example embodiment, the audio communicating process 144-2 notifies the originator (i.e., user 108-1) that the recipient (i.e., user 108-2) has received the audio message 160.

In step 205, the audio communicating process 144-2 provides an ability to respond to the complete audio message 160 via a media message. The recipient (i.e., user 108-2) receives the complete audio message 160 from an originator (i.e., user 108-1). The recipient (i.e., user 108-2) can respond to the complete audio message 160 in a variety of media, such as text message, email, etc.

Figure 4:
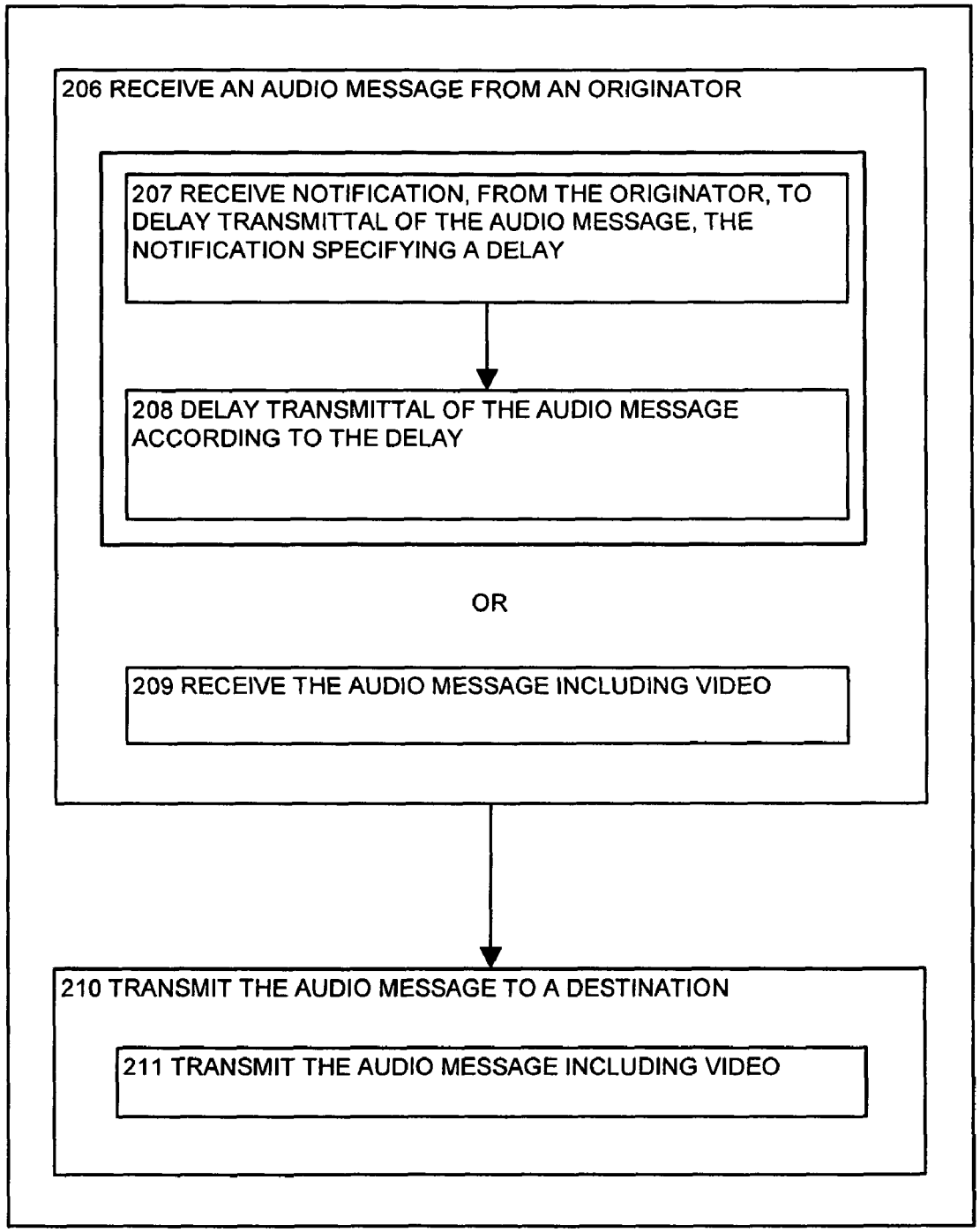
FIG. 4 illustrates a flowchart of a procedure performed by the system of FIG. 1, when the audio communicating process receives a complete audio message from an originator, and receives notification to delay transmittal of the complete audio message, according to one embodiment disclosed herein.

FIG. 4 is an embodiment of the steps performed by the audio communicating process 144-2 when it receives a complete audio message 160 from an originator (i.e., user 108-1).

In step 206, the audio communicating process 144-2 receives a complete audio message 160 from an originator (i.e., user 108-1). The originator (i.e., user 108-1) can perform actions on the complete audio message, or specify restrictions on the complete audio message 160.

In step 207, the audio communicating process 144-2 receives notification, from the originator (i.e., user 108-1), to delay transmittal of the complete audio message 160. The notification specifies a delay. The originator (i.e., user 108-1) may decide to delay the actual receipt of the complete audio message 160 at the audio communicating process 144-2, from the originator (i.e., user 108-1). The originator (i.e., user 108-1) can also specify the audio communicating process 144-2 transmits the complete audio message, but that the recipient (i.e., user 108-2) receives the complete audio message 160 at a later time. The originator (i.e., user 108-1) can specify what the actual delay is (i.e., what timeframe).

In step 208, the audio communicating process 144-2 delays transmittal of the complete audio message 160 according to the delay. Upon receiving instructions from the originator (i.e., user 108-1) to delay the transmittal of the complete audio message 160, the audio communicating process 144-2 delays the complete audio message 160. In an example configuration, the audio communicating process 144-2 delays transmittal of the complete audio message 160 until the recipient (i.e., user 108-2) is identified as being available to receive the complete audio message 160.

Alternatively, in step 209, the audio communicating process 144-2 receives the complete audio message 160 including video. The audio communicating process 144-2 receives a complete video/audio message 160 from an originator (i.e., user 108-1), and transmits the complete video/audio message 160 to the recipient (i.e., user 108-2). In an example embodiment, a recipient (i.e., user 108-2) is working on a computer (i.e., a device 145-2). A small screen pops up in a corner of the graphical user interface of the computer (i.e., a device 145-2). Within the small screen, the recipient (i.e., user 108-2) can see and hear the originator (i.e., user 108-1) within the complete video/audio message 160. The recipient (i.e., user 108-2) can then respond to the complete video/audio message 160, and the originator (i.e., user 108-1), on the originator's computer (i.e., device 145-1) can view and hear the recipient's (i.e., user 108-2) complete response video/audio message 160. This gives the feeling of two people conversing face to face.

In step 210, the audio communicating process 144-2 transmits the complete audio message 160 to a destination. An originator (i.e., user 108-1) creates a complete audio message 160, specifying a destination for the complete audio message 160, and the audio communicating process 144-2 transmits the complete audio message 160 to that destination.

In step 211, the audio communicating process 144-2 transmits the complete audio message 160 including video. In an example embodiment, the audio communicating process 144-2 receives a complete audio message 160, including video, from an originator (i.e., user 108-1). The audio communicating process 144-2 transmits the complete video/audio message 160, to the destination specified by the originator (i.e., user 108-1) of the complete video/audio message 160.

Figure 5:
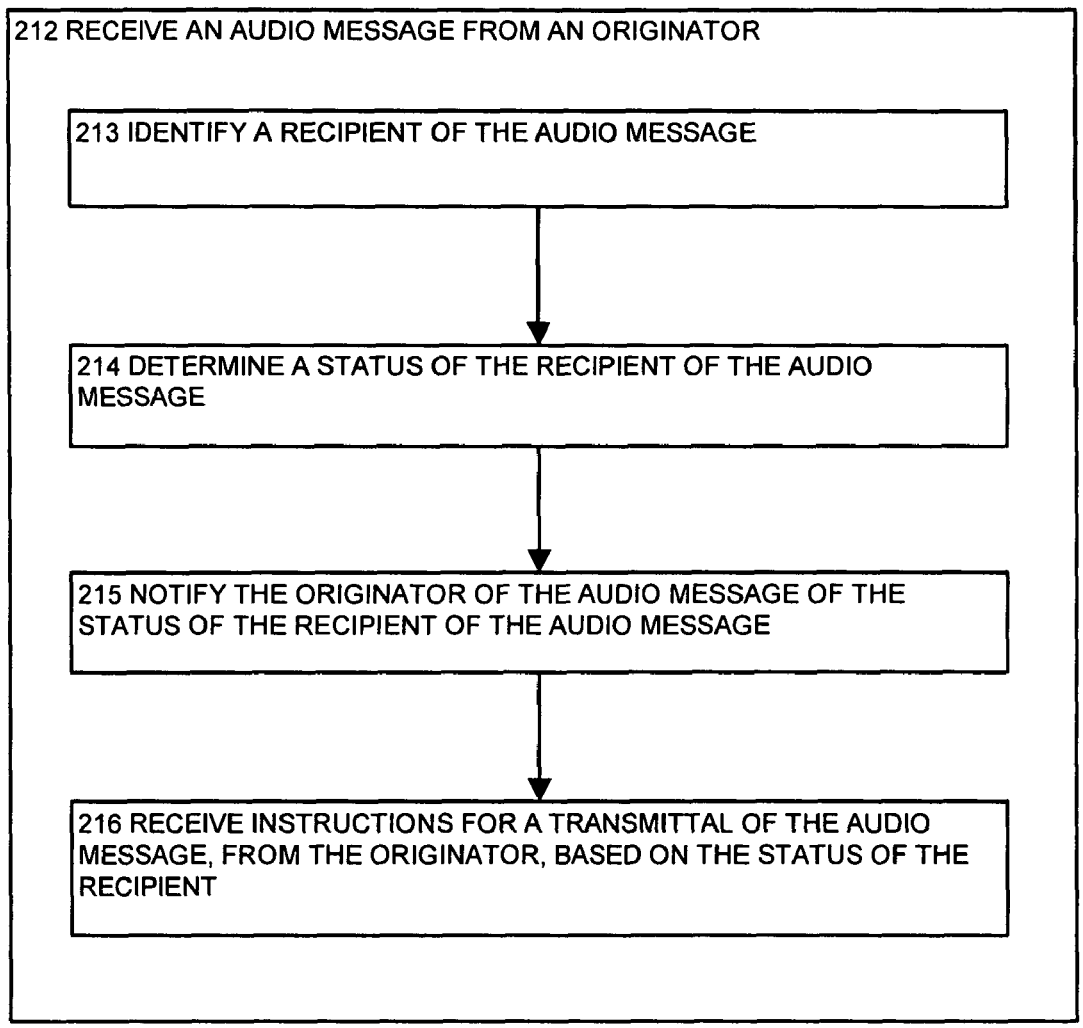
FIG. 5 illustrates a flowchart of a procedure performed by the system of FIG. 1, when the audio communicating process receives a complete audio message from an originator, and identifies a recipient of the complete audio message, according to one embodiment disclosed herein.

FIG. 5 is an embodiment of the steps performed by the audio communicating process 144-2 when it receives a complete audio message 160 from an originator (i.e., user 108-1).

In step 212, the audio communicating process 144-2 receives a complete audio message 160 from an originator (i.e., user 108-1). The originator (i.e., user 108-1) creates a complete audio message 160, and specifies one or more recipients (i.e., user 108-2) of that complete audio message 160.

In step 213, the audio communicating process 144-2 identifies a recipient (i.e., user 108-2) of the complete audio message 160. In an example embodiment, prior to the receipt of the complete audio message 160, from the originator (i.e., user 108-1), the audio communicating process 144-2 identifies recipients (i.e., user 108-2) possessing devices 145-N that are running the audio communicating process 144-2. In another example embodiment, the audio communicating process 144-2 determines the recipient (i.e., user 108-2) of the complete audio message 160 at the time the audio communicating process 144-2 receives the complete audio message 160 from the originator (i.e., user 108-1).

In step 214, the audio communicating process 144-2 determines a status of the recipient (i.e., user 108-2) of the complete audio message. For example, the recipient (i.e., user 108-2) may be online and available to receive complete audio messages 160. The recipient (i.e., user 108-2) may also busy, left the destination, etc.

In step 215, the audio communicating process 144-2 notifies the originator (i.e., user 108-1) of the complete audio message 160, of the status of the recipient (i.e., user 108-2) of the complete audio message 160. In an example embodiment, the originator (i.e., user 108-1) can view the status of the recipient (i.e., user 108-2) prior to initiating the complete audio message 160. In another example embodiment, the originator (i.e., user 108-1) is notified of the recipient's (i.e., user 108-2) status upon transmitting the complete audio message 160 to the audio communicating process 144-2.

In step 216, the audio communicating process 144-2 receives instructions for a transmittal of the complete audio message 160, from the originator (i.e., user 108-1), based on the status of the recipient (i.e., user 108-2). In an example embodiment, the originator (i.e., user 108-1) sees that the recipient (i.e., user 108-2) is online, and sends the complete audio message 160 because the recipient (i.e., user 108-2) is online, and available to receive the complete audio message 160. In another example embodiment, the originator (i.e., user 108-1) sees that the recipient (i.e., user 108-2) is in a meeting, and decides to put a time delay on the complete audio message 160 such that the recipient (i.e., user 108-2) will be online, and available to hear the complete audio message 160 when the complete audio message 160 is transmitted by the audio communicating process 144-2.

Figure 6:
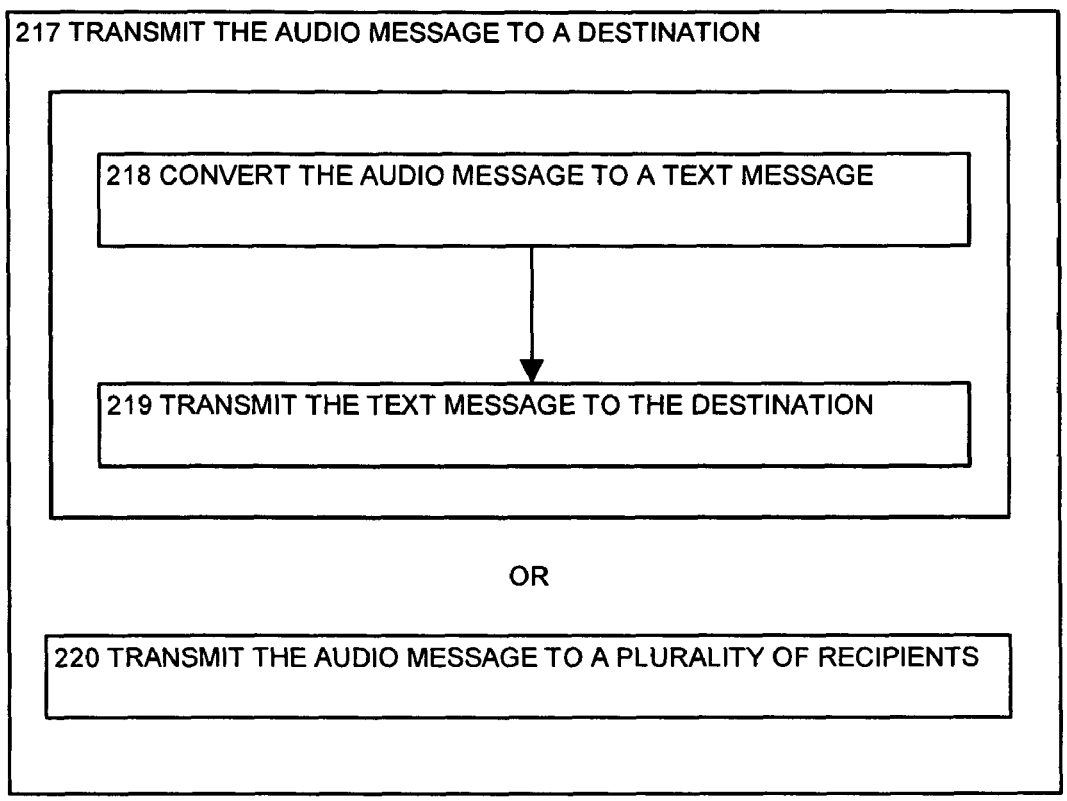
FIG. 6 illustrates a flowchart of a procedure performed by the system of FIG. 1, when the audio communicating process transmits the complete audio message to a destination, according to one embodiment disclosed herein.

FIG. 6 is an embodiment of the steps performed by the audio communicating process 144-2 when it transmits the complete audio message 160 to a destination.

In step 217, the audio communicating process 144-2 transmits the complete audio message 160 to a destination. The complete audio message 160 originates from the originator (i.e., user 108-1), and is received by the audio communicating process 144-2 as a complete audio message 160. The audio communicating process 144-2 then transmits the complete audio message 160 to the destination designated by the originator (i.e., user 108-1).

In step 218, the audio communicating process 144-2 converts the complete audio message 160 to a text message. In an example embodiment, the audio communicating process 144-2 receives the complete audio message 160 from the originator (i.e., user 108-1). The audio communicating process 144-2 converts the complete audio message 160 to a text message for delivery to the recipient (i.e., user 108-2).

In step 219, the audio communicating process 144-2 transmits the text message to the destination. The audio communicating process 144-2 converts the complete audio message 160 to a text message, and transmits the text message to the destination. The recipient (i.e., user 108-2) at the destination can respond to the text message in a variety of media, such as text message, complete audio message 160, etc. In an example embodiment, the audio communicating process 144-2 also transmits the audio message along with the text message to the destination. The recipient (i.e., user 108-2) then has the option of which of the messages (i.e., the text message or the audio message) to receive.

Alternatively, in step 220, the audio communicating process 144-2 transmits the complete audio message 160 to a plurality of recipients (i.e., users 108-2 and users 108-N, not shown). In an example embodiment, an originator (i.e., user 108-1) creates a complete audio message 160 meant for a plurality of recipients (i.e., users 108-2 and users 108-N, not shown). For example, a manager may create a complete audio message, asking that all employees report to a conference room for a meeting. The audio communicating process 144-2 receives the complete audio message 160, and transmits the complete audio message 160 to the plurality of (i.e., users 108-2 and users 108-N, not shown). The plurality of recipients (i.e., users 108-2 and users 108-N, not shown) may be located at the same destination or at different destinations. The audio communicating process 144-2 receives notification when the complete audio message 160 has been received by each of the plurality of recipients (i.e., users 108-2 and users 108-N, not shown).

Figure 7:
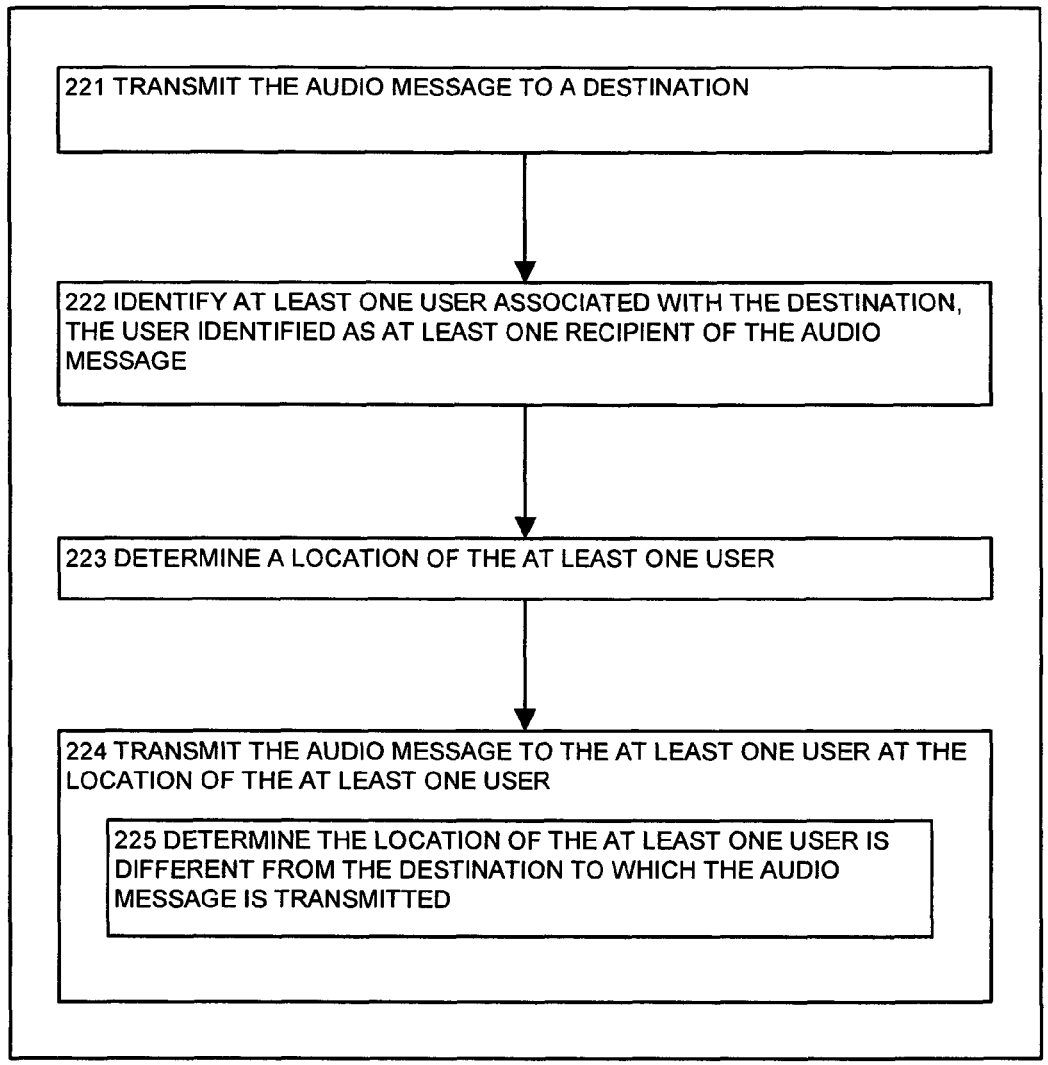
FIG. 7 illustrates a flowchart of a procedure performed by the system of FIG. 1, when the audio communicating process transmits the complete audio message to a destination, and identifies at least one user associated with the destination, according to one embodiment disclosed herein.

FIG. 7 is an embodiment of the steps performed by the audio communicating process 144-2 when it transmits the complete audio message 160 to a destination.

In step 221, the audio communicating process 144-2 transmits the complete audio message 160 to a destination. The complete audio message 160 originates from the originator (i.e., user 108-1), and is received by the audio communicating process 144-2 as a complete audio message 160. The audio communicating process 144-2 then transmits the complete audio message 160 to the destination designated by the originator (i.e., user 108-1).

In step 222, the audio communicating process 144-2 identifies at least one user 108-2 associated with the destination. The user 108-2 is identified as at least one recipient (i.e., user 108-2) of the complete audio message 160. For example, an originator (i.e., user 108-1) creates a complete audio message 160 to be sent to a recipient (i.e., user 108-2). The recipient (i.e., user 108-2) sits in their office using their computer (i.e., device 145-2). The computer (i.e., device 145-2) is the destination of the complete audio message 160. However, the recipient (i.e., user 108-2) is the user 108-2 identified to be associated with the destination.

In step 223, the audio communicating process 144-2 determines a location of the at least one user 108-2. In an example embodiment, the audio communicating process 144-2 determines a general location of the recipient (i.e., user 108-2). For example, the recipient's (i.e., user 108-2) computer (i.e., device 145-2) is the destination for the intended transmittal of the complete audio message 160. However, the audio communicating process 144-2 has determined that the recipient (i.e., user 108-2) is in the lunchroom.

In step 224, the audio communicating process 144-2 transmits the complete audio message 160 to at least one user 108-2, at the location of that user 108-2. In an example embodiment, the audio communicating process 144-2 has determined the location of the recipient (i.e., user 108-2), and transmits the complete audio message 160 to that location such that the recipient (i.e., user 108-2) is available to receive the complete audio message 160.

In step 225, the audio communicating process 144-2 determines the location of the user 108-2 is different from the destination to which the complete audio message 160 is transmitted. In an example embodiment, the complete audio message 160 is to be transmitted to the destination of the recipient's (i.e., user 108-2) computer (i.e., device 145-N). The audio communicating process 144-2 determines that the recipient (i.e., user 108-2) is not at his/her computer (i.e., device 145-N), but rather, in the lunchroom. The audio communicating process 144-2 transmits the complete audio message to the recipient's (i.e., user 108-2) cell phone such that the recipient (i.e., user 108-2) receives the complete audio message, despite being at a location different than the destination where the complete audio message was originally intended to be transmitted.

FIG. 8 is an embodiment of the steps performed by the audio communicating process 144-2 when it buffers the complete audio message 160 at the destination.

In step 226, the audio communicating process 144-2 buffers the complete audio message 160 at the destination. The complete audio message 160 is capable of being played at the destination during the buffering. The complete audio message 160 is received at the destination in 'soon time'. 'Soon time' is not real time, but, rather, provides a delay between when the complete audio message 160 is created, and when it is transmitted to a destination.

In step 227, the audio communicating process 144-2 transmits a plurality of complete audio messages 160-N to the destination. In an example embodiment, the plurality of complete audio messages 160-N may all originate from the same originator (i.e., user 108-1) or they may originate from different originator (i.e., user 108-1 and other users 108-N not shown).

In step 228, the audio communicating process 144-2 buffers the plurality of complete audio messages 160 according to a sequence. The audio communicating process 144-2 receives multiple complete audio messages 160 at once, and buffers them such that the recipient (i.e., user 108-2) can hear them in a sequence, rather than hearing multiple complete audio messages 160 at once, in a jumbled fashion. The sequence of the plurality of complete audio messages 160 can be according to a priority of the complete audio messages 160, the originator (i.e., user 108-1), etc.

In step 229, the audio communicating process 144-2 identifies the sequence as an order of arrival of each of the plurality of complete audio messages 160. In an example embodiment, the audio communicating process 144-2 buffers multiple messages in the order in which the complete audio messages 160 arrive. The recipient (i.e., user 108-2) may 'hear' the first incoming complete audio message 160, while a second incoming complete audio message 160 is being buffered. The audio communicating process 144-2 notifies the recipient (i.e., user 108-2) that additional complete audio messages 160 have been transmitted, and the recipient (i.e., user 108-2) can play those complete audio messages 160 that were buffered. In an example embodiment, the recipient (i.e., user 108-2) is receiving complete audio messages 160 from a plurality of originators (i.e., users 108-3, 108-4, 108-5, not shown). The audio communicating process 144-2 identifies the sequence of all the complete audio messages 160-N received by the recipient (i.e., user 108-2), as well as a sequence of complete audio messages 160-N originating from each of the originators (i.e., users 108-3, 108-4, 108-5, not shown) within the plurality of originators (i.e., users 108-3, 108-4, 108-5, not shown). In an example embodiment, the recipient (i.e., user 108-2) receives the complete audio messages 160 via a graphical user interface. The recipient (i.e., user 108-2) can visually see the complete audio messages 160 and add comments (i.e., via text or voice) to each of the complete audio messages 160. In step 230, the audio communicating process 144-2 identifies the sequence as an importance associated with each of the plurality of complete audio messages 160. In an example embodiment, a complete audio message 160 has an importance associated with each complete audio message 160. The originator (i.e., user 108-1) may indicate the importance of each complete audio message 160 by specifying a particular complete audio message 160 as being of high importance. The receipt of a complete audio message 160 from a particular originator (i.e., user 108-1) may automatically mark that complete audio message 160 as being of high importance. For example, a complete audio message 160 from a boss to an employee may automatically be marked as being of high importance by virtue of the status of the originator (i.e., user 108-1). In another example, the recipient (i.e., user 108-2) can block complete audio messages 160 that are associated with a certain importance. For example, the recipient (i.e., user 108-2) is in a meeting, and blocks all complete audio messages 160 that are of medium or low importance, but allows complete audio messages 160 that are of high importance to be transmitted.

In step 231, the audio communicating process 144-2 provides an ability to play the plurality of complete audio messages 160 according to the sequence. In an example embodiment, the audio communicating process 144-2 allows the recipient (i.e., user 108-2) to play the plurality of complete audio messages 160 according to the sequence, whether that is the order of arrival, for example, or the importance associated with each of the plurality of complete audio messages 160. In an example embodiment, the recipient (i.e., user 108-2) can determine the order in which to play the plurality of complete audio messages 160.

FIG. 9 is an embodiment of the steps performed by the audio communicating process 144-2 when it buffers the complete audio message 160 at the destination.

In step 232, the audio communicating process 144-2 buffers the complete audio message 160 at the destination. The complete audio message 160 is capable of being played at the destination during the buffering. The complete audio message 160 is received at the destination in 'soon time'. 'Soon time' is not real time, but, rather, provides a delay between when the complete audio message 160 is created, and when it is transmitted to a destination. In an example embodiment, the audio communicating process 144-2 provides the ability for the recipient (i.e., user 108-2) to acknowledge the complete audio message 160.

In step 233, the audio communicating process 144-2 provides an ability to pause the complete audio message 160 during a playing of the complete audio message 160. The audio communicating process 144-2 allows the recipient (i.e., user 108-2) to 'hear' the complete audio message 160 as it is being buffered. The audio communicating process 144-2 allows the recipient (i.e., user 108-2) to pause the complete audio message 160 during that time. The audio communicating process 144-2 also allows the recipient (i.e., user 108-2) to play back a buffered complete audio message 160, and to pause the complete audio message 160 during the playing back of the buffered complete audio message 160.

In step 234, the audio communicating process 144-2 provides an ability to resume the playing of the complete audio message 160. The audio communicating process 144-2 allows a recipient (i.e., user 108-2) to pause a complete audio message 160, and then resume the playing of that complete audio message 160.

Alternatively, in step 235, the audio communicating process 144-2 notifies at least one user 108-2, at the destination, that a complete audio message 160 has been transmitted. In an example embodiment, the recipient (i.e., user 108-2) of the complete audio message 160 is using a computer (i.e., device 145-2). The recipient (i.e., user 108-2) receives notification on the computer (i.e., device 145-2), such as an envelope icon, indicating that a complete audio message 160 is being transmitted. The recipient (i.e., user 108-2) can choose to listen to the complete audio message 160 as the complete audio message 160 is being buffered, or wait until the buffering is completed.

Figure 10:
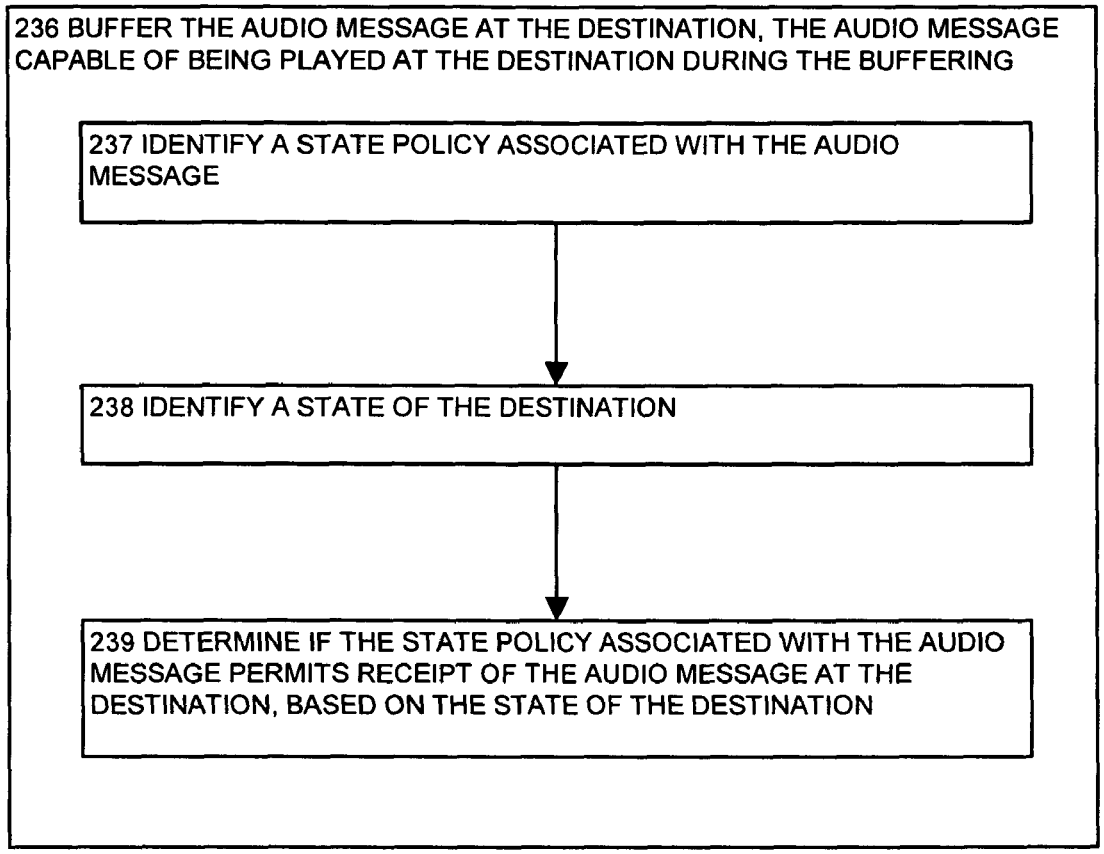
FIG. 10 illustrates a flowchart of a procedure performed by the system of FIG. 1, when the audio communicating process buffers the complete audio message at the destination, and identifies a state policy associated with the complete audio message, according to one embodiment disclosed herein.

FIG. 10 is an embodiment of the steps performed by the audio communicating process 144-2 when it buffers the complete audio message 160 at the destination.

In step 236, the audio communicating process 144-2 buffers the complete audio message 160 at the destination. The complete audio message 160 is capable of being played at the destination during the buffering. The complete audio message 160 is received at the destination in 'soon time'. 'Soon time' is not real time, but, rather, provides a delay between when the complete audio message 160 is created, and when it is transmitted to a destination.

In step 237, the audio communicating process 144-2 identifies a state policy associated with the complete audio message 160. A state policy can, for example, specify that only certain recipient (i.e., user 108-2 and other recipients 108-N, not shown) are allowed to hear the complete audio message 160.

In step 238, the audio communicating process 144-2 identifies a state of the destination. In an example embodiment, the audio communicating process 144-2 determines that the destination of the complete audio message 160 is an office containing one recipient (i.e., user 108-2) of the complete audio message 160, along with several colleagues of the recipient (i.e., user 108-2).

In step 239, the audio communicating process 144-2 determines if the state policy associated with the complete audio message 160 permits receipt of the complete audio message 160 at the destination, based on the state of the destination. In an example embodiment, the audio communicating process 144-2 determines the policy associated with the complete audio message 160 allows only privileged users 108-2, and other users 108-N, not shown) to hear the complete audio message 160. The audio communicating process 144-2 identifies the colleagues that are located at the destination with the recipient (i.e., user 108-2) as users 108-N, not shown, that are privileged to hear the complete audio message 160. The audio communicating process 144-2 then determines that, based on the state of the destination, the state policy associated with the complete audio message 160 permits receipt of the complete audio message 160 by the recipient (i.e., user 108-2), including the colleagues who are in the office with the recipient (i.e., user 108-2). Alternatively, if the audio communicating process 144-2 determines that one of the colleagues in the office with the recipient (i.e., user 108-2) was not privileged to hear the complete audio message 160, the audio communicating process 144-2 buffers the complete audio message 160, and notifies the recipient (i.e., user 108-2) that a complete audio message 160 has been buffered. The recipient (i.e., user 108-2) can then listen to the complete audio message 160 at a late time, when the colleague who is not privileged to hear the complete audio message 160, is no longer in the office with the recipient (i.e., user 108-2).

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method of communicating, the method comprising:
receiving a complete audio message from an originator;
transmitting the complete audio message to a destination;
buffering the complete audio message at the destination, the complete audio message capable of being played at the destination during the buffering; and
providing an ability to replay the complete audio message at the destination after the buffering of the complete audio message.

2. The method of claim 1 comprising:
providing an ability to respond to the complete audio message.

3. The method of claim 2 wherein providing an ability to respond to the complete audio message comprises:
providing an ability to respond to the complete audio message via a media message.

4. The method of claim 1 wherein receiving a complete audio message from an originator comprises:
receiving notification, from the originator, to delay transmittal of the complete audio message, the notification specifying a delay; and
delaying transmittal of the complete audio message according to the delay.

5. The method of claim 1 wherein receiving a complete audio message from an originator; comprises:
identifying a recipient of the complete audio message;
determining a status of the recipient of the complete audio message; and
notifying the originator of the complete audio message of the status of the recipient of the complete audio message.

6. The method of claim 5 comprising:
receiving instructions for a transmittal of the complete audio message, from the originator, based on the status of the recipient.

7. The method of claim 1 wherein receiving a complete audio message from an originator comprises:
receiving the complete audio message including video; and
wherein transmitting the complete audio message to a destination comprises:
transmitting the complete audio message including video.

8. The method of claim 1 wherein transmitting the complete audio message to a destination comprises:
transmitting the complete audio message to a plurality of recipients.

9. The method of claim 1 wherein transmitting the complete audio message to a destination comprises:
converting the complete audio message to a text message; and
transmitting the text message to the destination.

10. The method of claim 1 wherein transmitting the complete audio message to a destination comprises:
identifying at least one user associated with the destination, the user identified as at least one recipient of the complete audio message;
determining a location of the at least one user; and
transmitting the complete audio message to the at least one user at the location of the at least one user.

11. The method of claim 10 wherein transmitting the complete audio message to the at least one user at the location of the at least one user comprises:
determining the location of the at least one user is different from the destination to which the complete audio message is transmitted.

12. The method of claim 1 wherein buffering the complete audio message at the destination, the complete audio message capable of being played at the destination during the buffering comprises:
transmitting a plurality of complete audio messages to the destination;
buffering the plurality of complete audio messages according to a sequence; and
providing an ability to play the plurality of complete audio messages according to the sequence.

13. The method of claim 12 wherein buffering the plurality of complete audio messages according to a sequence comprises:

identifying the sequence as an order of arrival of each of the plurality of complete audio messages.

14. The method of claim 12 wherein buffering the plurality of complete audio messages according to a sequence comprises:

identifying the sequence as an importance associated with each of the plurality of complete audio messages.

15. The method of claim 1 wherein buffering the complete audio message at the destination, the complete audio message capable of being played at the destination during the buffering comprises:

providing an ability to pause the complete audio message during a playing of the complete audio message; and providing an ability to resume the playing of the complete audio message.

16. The method of claim 1 wherein buffering the complete audio message at the destination, the complete audio message capable of being played at the destination during the buffering comprises:

notifying at least one user at the destination that a complete audio message has been transmitted.

17. The method of claim 1 wherein buffering the complete audio message at the destination, the complete audio message capable of being played at the destination during the buffering comprises:

identifying a state policy associated with the complete audio message;

identifying a state of the destination; and determining if the state policy associated with the complete audio message permits receipt of the complete audio message at the destination, based on the state of the destination.

18. A computerized device comprising:

a memory;

a processor;

a communications interface;

an interconnection mechanism coupling the memory, the processor and the communications interface;

wherein the memory is encoded with a audio communication application that when executed on the processor is capable of communication via complete audio messages on the computerized device by performing the operations of:

receiving a complete audio message from an originator;

transmitting the complete audio message to a destination;

buffering the complete audio message at the destination, the complete audio message capable of being played at the destination during the buffering; and providing an ability to replay the complete audio message at the destination after the buffering of the complete audio message.

19. The computerized device of claim 18 wherein the computerized device is capable of performing the operation of:

providing an ability to respond to the complete audio message.

20. A computer readable medium encoded with computer programming logic that when executed on a process in a computerized device provides audio communication, the medium comprising:

instructions for receiving a complete audio message from an originator;

instructions for transmitting the complete audio message to a destination;

instructions for buffering the complete audio message at the destination, the complete audio message capable of being played at the destination during the buffering; and instructions for providing an ability to replay the complete audio message at the destination after the buffering of the complete audio message.

\* \* \* \* \*